United States Patent [19]

Baek et al.

[11] Patent Number: 5,291,214
[45] Date of Patent: Mar. 1, 1994

[54] METHOD AND APPARATUS FOR SCANNING A RECEIVING MEDIUM

[75] Inventors: Seung H. Baek, Pittsford; Thomas A. Mackin, Hamlin, both of N.Y.; Ephraim Pinsky, Kiryat Tiv'on, Israel

[73] Assignee: Eastman Kodak Company, Rochester, N.Y.

[21] Appl. No.: 724,059

[22] Filed: Jul. 1, 1991

[51] Int. Cl.$^5$ .............................................. B41J 25/00
[52] U.S. Cl. ................................. 346/1.1; 346/139 D
[58] Field of Search ................ 346/76 L, 1.1, 139 D, 346/139 R; 358/298; 400/328, 903

[56] References Cited

U.S. PATENT DOCUMENTS

| | | | |
|---|---|---|---|
| 4,468,706 | 8/1984 | Cahill | 358/298 X |
| 4,724,366 | 2/1988 | Neesz | 318/461 X |
| 4,772,582 | 9/1988 | DeBoer | 503/227 |
| 4,924,321 | 5/1990 | Miyagawa et al. | 346/76 L X |
| 4,985,779 | 1/1991 | Gall | 358/298 |

Primary Examiner—Benjamin R. Fuller
Assistant Examiner—David Yockey
Attorney, Agent, or Firm—Robert L. Randall

[57] ABSTRACT

A method and apparatus are disclosed for scanning a receiving medium. The apparatus comprises a motor-driven lead screw which is used to advance a print head relative to a receiving medium supported on a rotatable drum. In order to overcome the problem of banding in an image produced by the apparatus as a result of a sinusoidal pitch error of the lead screw, the pitch error of the lead screw is broken up into a random pitch error. In another embodiment, the pitch error frequency is shifted to a higher frequency which is less sensitive to the human eye.

13 Claims, 4 Drawing Sheets

METHOD AND APPARATUS FOR SCANNING A RECEIVING MEDIUM

BACKGROUND OF THE INVENTION

Cross Reference to Related Applications

Reference is made to, U.S. patent application Ser. No 724,061, entitled "Method and Apparatus for Scanning a Receiving Medium," filed on even date herewith in the names of Baek, Mackin, Firth, and Woo, and to U.S. patent application Ser. No. 724,060, entitled "Method and Apparatus for Scanning a Receiving Medium," filed on even date herewith in the name of Mackin et al. These applications are assigned to the assignee of the present application.

Field of the Invention

The present invention relates to a method and apparatus for scanning a receiving medium, and more particularly, to such a method and apparatus for preventing artifacts in an image produced thereby.

State of the Prior Art

It is known in scanner apparatus, such as a laser printer, to use a lead screw to provide relative movement between a light source and a photosensitive receiving medium. One problem in the use of lead screws is that artifacts can occur in an image as a result of very minute variations of lead screw pitch. These artifacts, known as "banding," appear as repetitive patterns in an image. The repetitive patterns are due to periodic variations of density in the image, and the eye is extremely sensitive to these variations, especially in areas which are nominally of uniform tone. In order to achieve band-free images in scanner apparatus using lead screws, extremely high precision lead screws must be used. Such lead screws, however, are too expensive for many applications.

In one type of scanner apparatus, a s photosensitive material is supported on a rotatable drum, and a light source or print head is carried on a lead screw. The problem of banding can be particularly troublesome when such apparatus is used for half-tone printing. The dot placement for half-tone printing is determined by the directional movements of the drum and the lead screw. The drum velocity can be controlled to a degree by a closed-loop speed control system. However, the pitch error of the lead screw cannot be corrected by a closed-loop speed control system, and thus, either a high-precision lead screw must be used to keep the error within acceptable limits or a closed-loop positioning system must be used for error correction.

Unfortunately, neither the high-precision lead screw nor the closed-loop positioning system are acceptable solutions to the problem of pitch error in lead screws for drum scanners. The disadvantages of high-precision lead screws have s been noted above. A closed-loop positioning system for a drum scanner requires a linear position detector with a very high resolution. Since the printing head needs to scan the entire length of a document, the linear position detector must have high resolution over a relatively long distance. The requirement for high resolution over a long distance makes the positioning system very complex and expensive.

SUMMARY OF THE INVENTION

It is an object of the present invention to overcome the problems in the prior art discussed above and to provide improved method and apparatus for scanning a receiving medium.

In accordance with one aspect of the invention, there is provided a method for scanning a receiving medium, the method comprising the steps of: injecting an error signal into a command signal to form a modified command signal; and providing the modified command signal to a drive means to effect relative movement between a beam of radiation and the receiving medium.

In accordance with another aspect of the present invention, there is provided apparatus for scanning a receiving medium, the apparatus comprising: drive means for providing relative movement between the medium and a scan head in response to a command signal; and means for injecting an error signal into the command signal.

In one embodiment of the present invention, the sinusoidal pitch error of a lead screw is broken up into a random pitch error using FM modulation. A velocity command signal for the lead screw motor is combined with a signal from an analog noise generator to form a modified command signal. In a second embodiment of the invention, the modified command signal is multiplied by a random signal which results in modulation of the amplitude as well as the frequency. In a third embodiment of the invention, the lead screw pitch error frequency is shifted to a higher frequency which is less sensitive to the eye.

A principal advantage of the method and apparatus of the present invention is that an image free of artifacts can be produced in both half-tone and continuous-tone printing. A further advantage is that such an image can be produced without major modification of conventional scanner components. A still further advantage is that a relatively inexpensive lead screw can be used in the scanner apparatus of the present invention without loss of image quality.

Other features and advantages will become apparent with reference to the following description of the preferred embodiment when read in light of the attached drawings.

DESCRIPTION OF THE PREFERRED EMBODIMENTS

The present invention is described herein with reference to a printer. However, the invention is also applicable to an input scanner which is used to covert an image into an electrical signal. The term "receiving medium," as used herein is intended to include any medium on which an image can be formed as well as any medium which has an image formed thereon such as, for example, a photographic film, a photoconductor, or a document.

Figure 1:
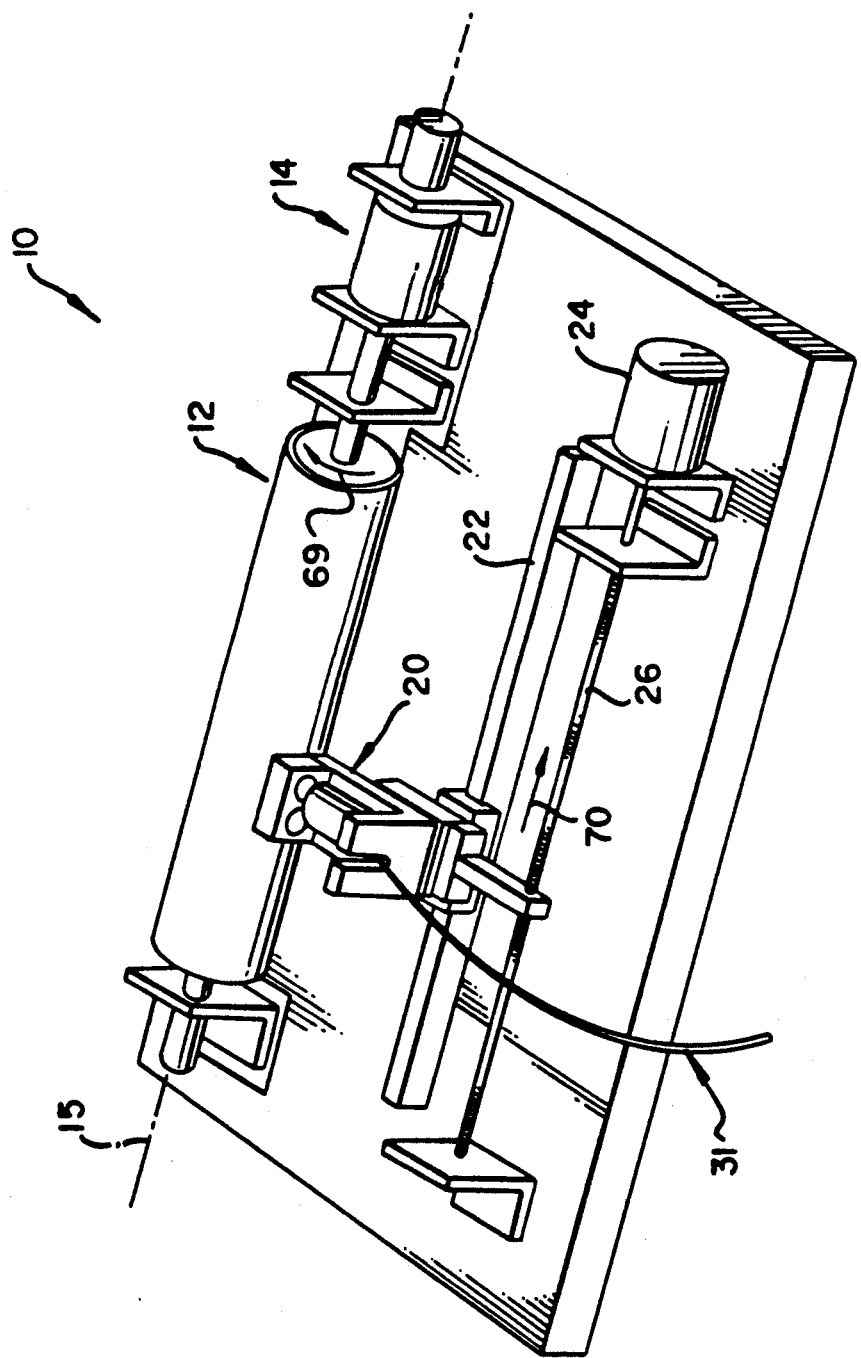
FIG. 1 is a perspective view of a printer of a type which can utilize the present invention.

The present invention can be used in, for example, a thermal printer such as printer 10 shown in FIG. 1. Printer 10 comprises a drum 12 which is mounted for rotation about an axis 15 and is driven by a motor 14. Drum 12 is adapted to support a thermal print medium, not shown, of a type in which a dye is transferred by sublimation from a donor to a receiver as a result of heating the dye in the donor. A thermal print medium for use with the printer 10 can be, for example, a medium disclosed in U.S. Pat. No 4,772,582, entitled "Spacer Bead Layer for Dye-Donor Element Used in Laser Induced Thermal Dye Transfer," granted Sep. 20, 1988. This patent is assigned to the assignee of the present invention.

A scan head 20 is movably supported adjacent drum 12. Scan head 20 is supported for slidable movement on a rail 22, and the scan head 20 is driven by means of a motor 24 which rotates a lead screw 26. Scan head 20 comprises an array of optical fibers 31 which are connected to a plurality of diode lasers (not shown). The diode lasers can be individually modulated to selectively direct light from the optical fibers onto the thermal print medium. A more complete description of the thermal printer described herein can be found in U.S. application Ser. No. 451,655, now U.S. Pat. No. 5,164,742, filed on Dec. 18, 1989, in the names of Seung H. Baek et al., and the disclosure in this application is expressly incorporated herein by reference.

Typical lead screws have sinusoidal pitch errors that are a result of the manufacturing process. The present invention is directed to overcoming the effects of such errors in an image. If the thread pitch has a nominal pitch (constant), $D_{nominal}$, and a sinusoidal pitch error, $D_{error}$, then $$D_{pitch} = D_{nominal} + D_{error} \quad (1)$$

and $$D_{error} = A \cos(\omega_o \tau) \quad (2)$$
$$= A \cos(2\pi\alpha\tau)$$

where $D_{nominal} >> D_{error}$, A is the maximum magnitude of the sinusoidal error, $\alpha$ is the number of pitches which make one complete cycle of the sinusoidal pitch error, and $\tau$ is the number of screw revolutions.

If the sinusoidal error of the pitch is broken up into either a random pitch error or higher frequency error which is less sensitive to the human eye, any banding due to the sinusoidal error will disappear. In two embodiments of the present invention, this objective is accomplished by disturbing the repetitive sinusoidal line spacing errors using artificial error mixing, which is an equivalent of frequency modulation (FM modulation). In a third embodiment, the error frequency is shifted to a higher frequency which is less sensitive to the eye. The methods of pitch error correction disclosed herein can be applied in all applications where unwanted artifacts in multi-line scanning are caused by inaccuracy of dot placement or beat frequency moiré patterns.

In one embodiment of FM modulation pitch error correction, the pitch correction would be, as follows:

$$D(\lambda\tau)_{corrected} = A \cos[\alpha\pi\sin(\pi\beta\tau)] \quad (3)$$

where the original error is as described in Eq. (2). The spatial frequency has been modulated by $\sin(\pi\beta\tau)$. The result of the FM modulation is shown in s FIG. 2. The original sinusoidal error, shown by the dark line 40, has been modulated with another sinusoidal frequency; this results in the rather random error shown as the lighter line 42. It will be seen that the error amplitude remains the same, but the error frequency has been disturbed without any visible dominant frequency.

The present invention can be implemented using an open-loop stepping motor or a closed-loop D.C. motor where the loop is closed around the rotational speed and position of the motor shaft. These techniques can be used in helically scanned systems where the threaded screw turns at a constant velocity and traces out a helix on the drum; they can also be used in systems that employ the step-and-stare concept where the lead screw is sequentially actuated to move a scan head to a new position after writing a given number of lines. In the helically scanned system, the sinusoidal correction algorithm would vary the "constant" angular speed of the screw. In the step-and-stare system, the algorithm would modify the next target position. The degree of FM modulation and other feedback parameters can be determined according to the nature of banding, the particular mechanism, and the printing system parameters.

Figure 2:
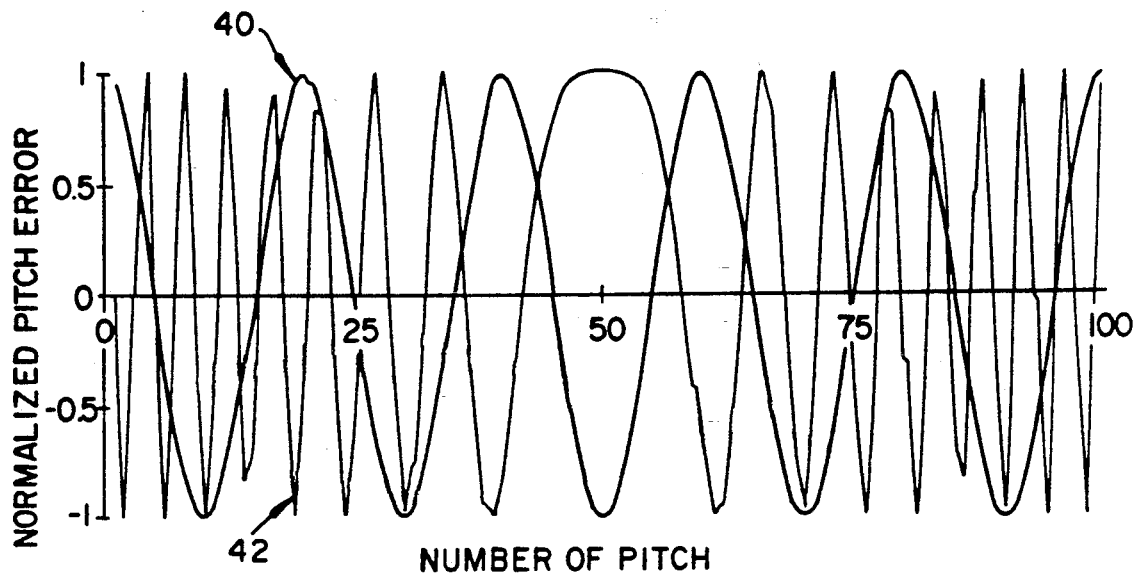
FIG. 2 is a diagram illustrating FM modulation of the sinusoidal pitch error in one embodiment of the present invention.
Figure 3:
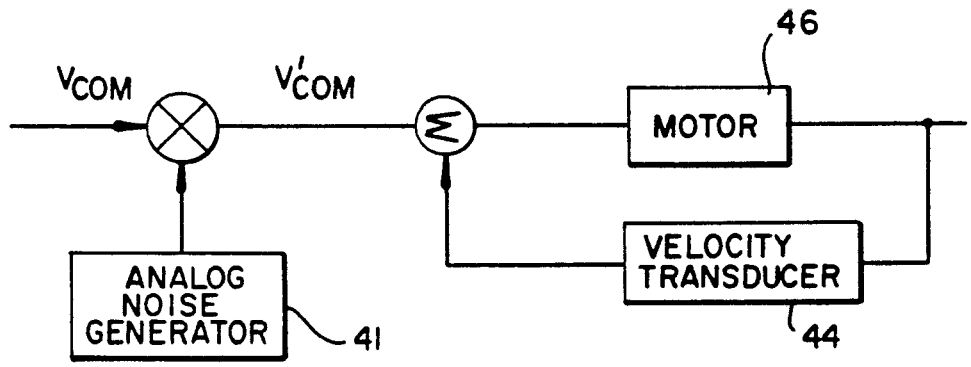
FIGS. 3 and 4 show closed-loop and open-loop systems, respectively, for accomplishing the FM modulation illustrated in FIG. 2.

With reference to FIG. 3, there is shown a block diagram of elements for accomplishing the frequency modulation illustrated in FIG. 2. In FIG. 3, a velocity command signal, $V_{com}$ is combined with a signal from an analog noise generator 41 which can be, for example, a zener diode in avalanche mode. The modified command signal, $V'_{com}$ is summed with a signal from a velocity transducer 44, such as a tachometer or encoder, and the summed signal is provided to drive motor 46.

Figure 4:
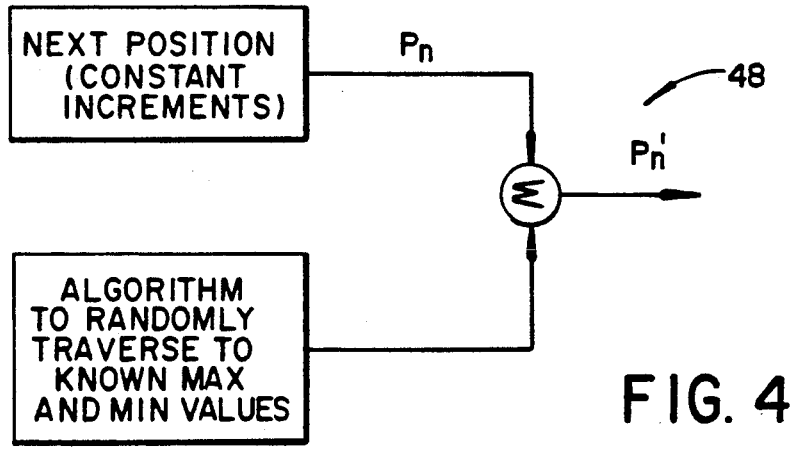

In FIG. 4, there are illustrated elements for accomplishing the frequency modulation in a step-and-stare system 48 for effecting the sequential movement of a write head to a new position after writing a given number of lines of data. In such a system, next position signals, $P_n$ are combined with signals provided by, for example, an algorithm to produce a modified signal, $P_{n'}$. Signals from the algorithm would randomly traverse to known maximum and minimum values for the position increments.

Figure 5:
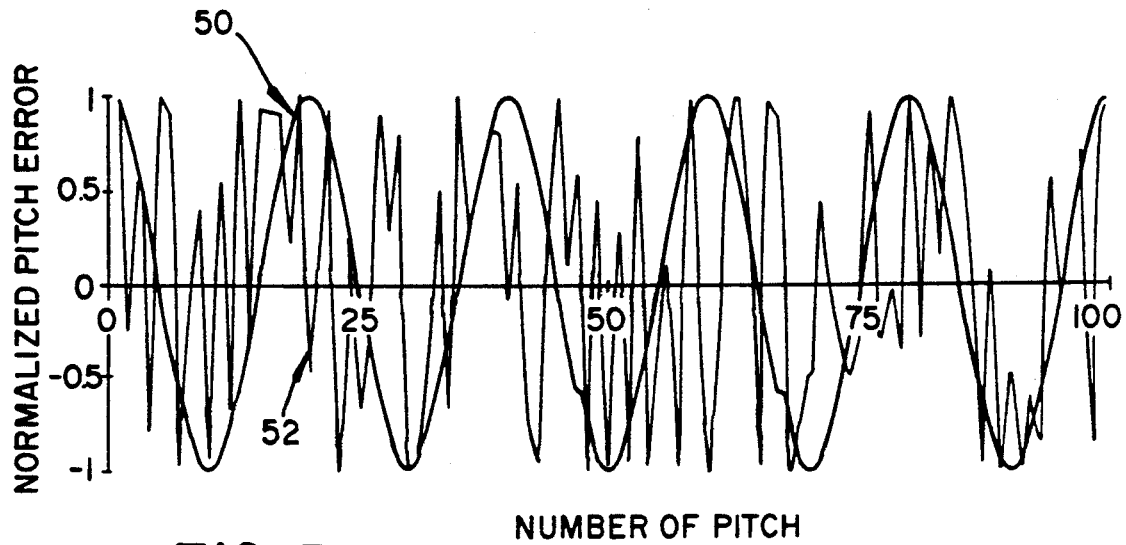
FIG. 5 is a diagram illustrating FM modulation in a second embodiment of the present invention.
Figure 6:
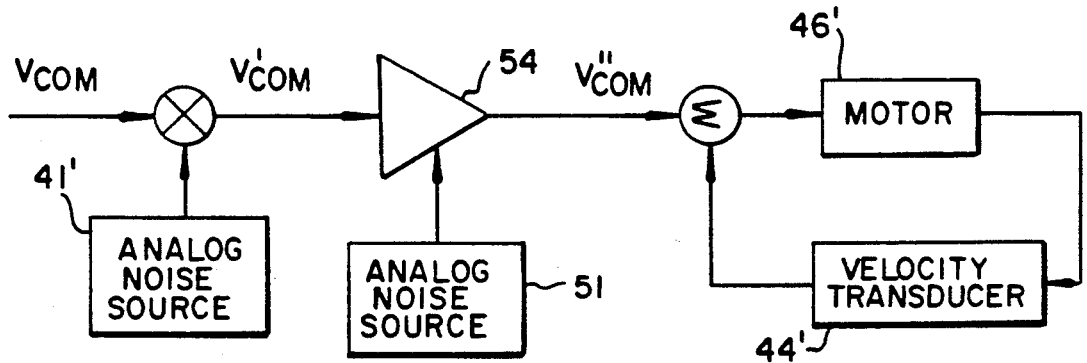
FIGS. 6 and 7 show closed-loop and open-loop systems, respectively, for accomplishing the FM modulation illustrated in FIG. 5.
Figure 7:
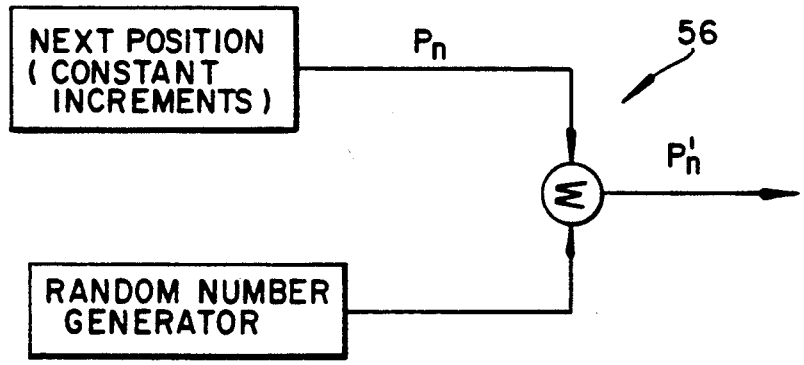

With reference to FIGS. 5-7, there is shown a second embodiment of the present invention in which there is randomized FM modulation pitch error correction. In this embodiment, the modified command signal, $V'_{com}$ produced as described above, is multiplied by a random number which results in modulation of the amplitude of the error as well as the frequency. Such a process can be represented, as follows:

$$D(\omega\tau)_{corrected} = \cos[\alpha\pi RAND()\sin(\pi\beta\tau)] \quad (4)$$

where RAND() is the randomization process of FM modulation and RAND()=(0<RANDOM NUM- BER<1). The result is shown in FIG. 5. The original error is shown as dark line 50, and the resulting randomized FM modulation is shown as the light line 52 in FIG. 5. It will be seen that two randomizations are achieved—in the amplitude as well as in the frequency.

In FIG. 6, there are shown elements for accomplishing the randomized FM modulated error illustrated in FIG. 5. A velocity command $V_{com}$ signal is combined with a signal from an analog noise generator 41', and a modified command signal $V'_{com}$ is provided to a variable gain amplifier 54. A second analog noise source 51, independent of analog noise source 41', provides a signal to amplifier 54. The resulting signal, $V''_{com}$ is then provided to the motor as described above. As shown in FIG. 7, a randomized FM modulated error signal can be provided to a step-and-stare system 56.

In a third embodiment of the present invention, the low frequency lead screw pitch error is shifted to a much higher frequency error by mixing the two frequencies $l_n$ and $l_o$ together. The frequency mixing can shift the pitch error from a frequency near the eye-sensitive region to a less sensitive higher frequency region. This approach can be explained by using a simple trigonometric sum and difference formula as:

$$D(\omega\tau)_{corrected} = \cos(\alpha\pi\tau) \cdot \cos(\beta\pi\tau) \quad (5)$$
$$= \cos(\omega_o\tau) \cdot \cos(\omega_n\tau)$$
$$= \tfrac{1}{2}\{\cos(\omega_n + \omega_o)\tau + \cos(\omega_n - \omega_o)\tau\}$$

where $\omega_n >> \omega_o$, so that the original low frequency banding due to the pitch error is shifted to the higher frequency banding, which has a very high threshold for visibility.

Figure 8:
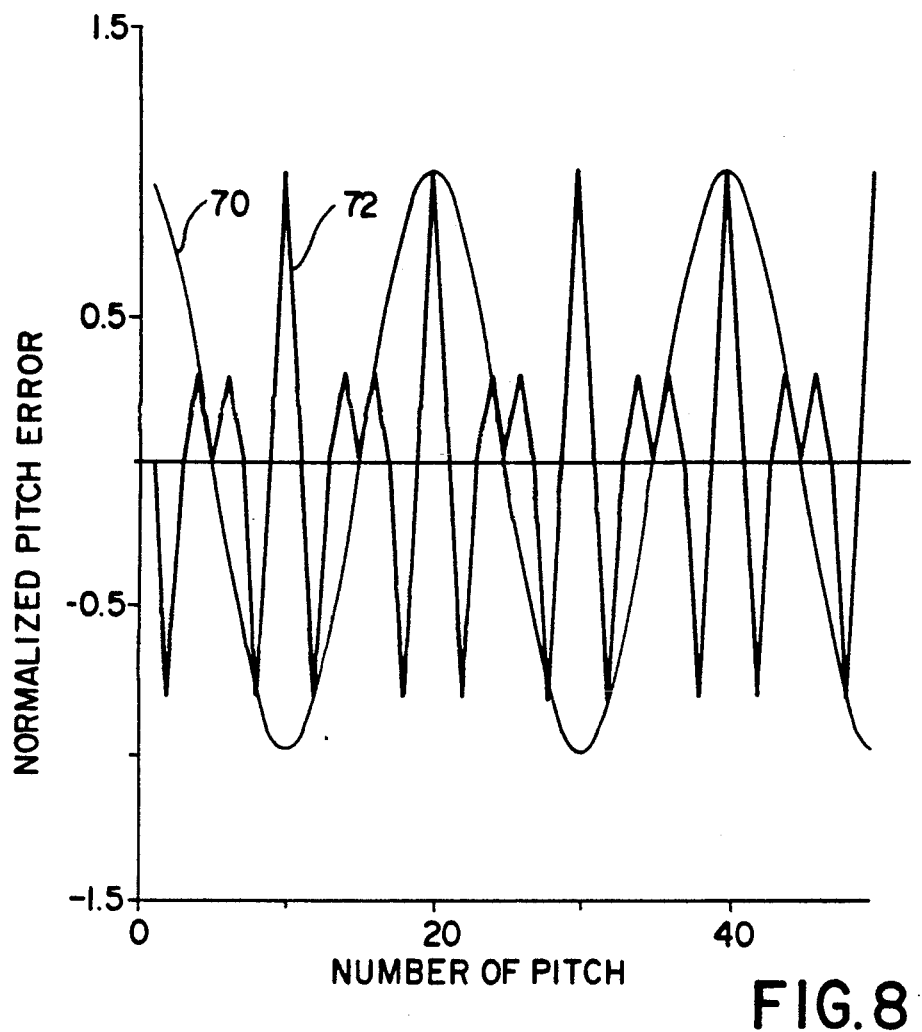
FIG. 8 illustrates the results of shifting the low frequency pitch error to a much higher frequency pitch error in a third embodiment of the present invention.

The mixing of the artificial frequency component is illustrated in FIG. 8. In FIG. 8, the original low frequency sinusoidal error signal 70 is shown as a light line , and the resultant mixed frequency signal 72 is shown as a dark line . It will be seen that the frequency of signal 72 is higher than the frequency of the signal 70 and that there is some amplitude modulation in the signal 72.

Figure 9:
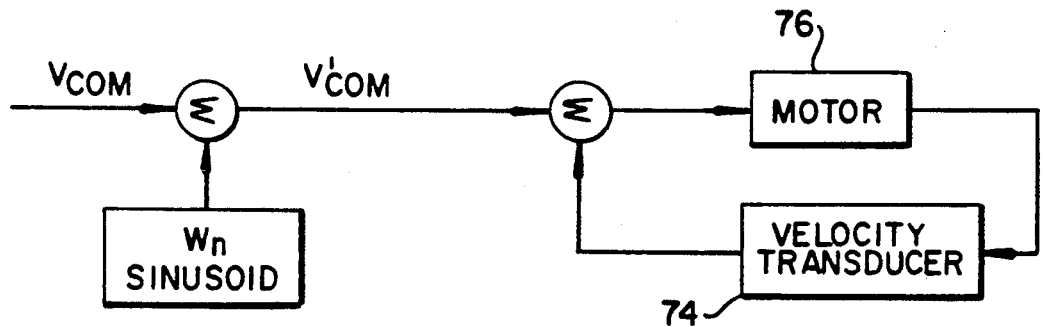
FIGS. 9 and 10 show closed loop and open loop systems, repectively, for shifting the pitch error as illustrated in FIG. 8.
Figure 10:
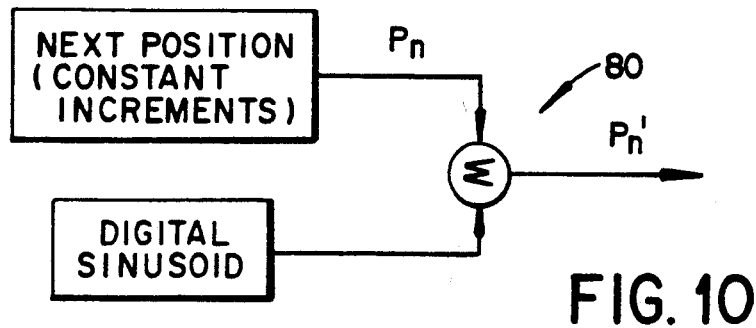

In FIG. 9, there is shown an implementation of the mixing of a high frequency component with the relatively low frequency pitch error. A velocity command signal $V_{com}$ is combined with a high frequency sinusoid, and the resulting signal $V'_{com}$ is combined with a signal from velocity transducer 74 to produce a drive signal to the motor 76. As shown in FIG. 10, the shifting of the low frequency pitch error to a much higher pitch error can be effected in a step-and-stare system 80.

The invention has been described in detail with particular reference to the preferred embodiments thereof, but it will be understood that variations and modifications can be effected within the spirit and scope of the invention.

We claim:

1. A method of scanning a receiving medium to write an image on said medium in an apparatus comprising means for supporting said medium, a scan head movable relative to said medium, means for moving said scan head relative to said medium including a lead screw having a pitch error which adversely affects the image written on said medium, and a motor arranged to drive said lead screw in response to a command signal supplied thereto, said method comprising the step of injecting an error signal into said command signal to variably drive said lead screw whereby adverse image effects are minimized.

2. A method of scanning, as defined in claim 1 wherein said error signal consists of random noise.

3. A method of scanning, as defined in claim 2, wherein said random noise is provided by an analog noise generator.

4. A method of scanning, as defined in claim 1, wherein said error signal is a high frequency sinusoidal signal.

5. Apparatus for writing an image on a receiving medium by scanning said receiving medium, said apparatus comprising means for supporting said medium, a scan head movable relative to said medium, means for moving said scan head relative to said medium including a lead screw having a pitch error which adversely affects the image written on said medium, a motor arranged to drive said lead screw in response to a command signal supplied thereto, and means for injecting an error signal into said command signal to variably drive said lead screw whereby adverse image effects are minimized.

6. Apparatus, as defined in claim 5, wherein said injecting means includes an analog signal generator.

7. Apparatus, as defined in claim 6, wherein said analog signal generator produces said error signal which is injected into said command signal to form a modified command signal which variably drives said lead screw drive motor.

8. Apparatus, as defined in claim 7, wherein said apparatus comprises a second analog signal generator, and means for combining a signal from said second analog signal generator with said modified command signal to form a second modified command signal which variably drives said lead screw drive motor.

9. Apparatus, as defined in claim 5, wherein said error signal is a high frequency sinusoidal signal.

10. Apparatus, as defined in claim 5, wherein said command signal is a velocity command signal.

11. Apparatus, as defined in claim 5, wherein error signal is a random pitch error signal provided to a drive for said lead screw.

12. Apparatus, as defined in in claim 5, wherein said error signal is a high frequency error signal provided to a drive for said lead screw.

13. Apparatus for writing an image on a receiving medium by scanning said receiving medium, said apparatus comprising means for supporting said medium, a scan head movable relative to said medium, means for moving said scan head relative to said medium including a lead screw having a pitch error which adversely affects the image written on said medium, a motor arranged to drive said lead screw in response to a position command signal representing a position of said scan head supplied to said motor, and means for injecting an error signal into said position command signal to variably drive said lead screw whereby adverse image effects are minimized.

* * * * *